United States Patent
Nakamura (10) Patent No.: US 9,078,132 B2
(45) Date of Patent: Jul. 7, 2015

(54) RADIO COMMUNICATION SYSTEM, RADIO BASE STATION, AND COMMUNICATION CONTROL METHOD

(75) Inventor: Kazutaka Nakamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 303 days.

(21) Appl. No.: 13/643,888

(22) PCT Filed: Apr. 19, 2011

(86) PCT No.: PCT/JP2011/059612
§ 371 (c)(1),
(2), (4) Date: Oct. 26, 2012

(87) PCT Pub. No.: WO2011/136083
PCT Pub. Date: Nov. 3, 2011

(65) Prior Publication Data
US 2013/0045694 A1 Feb. 21, 2013

(30) Foreign Application Priority Data
Apr. 28, 2010 (JP) ................................. 2010-104439

(51) Int. Cl.
*H04B 1/00* (2006.01)
*H04W 16/08* (2009.01)
(Continued)

(52) U.S. Cl.
CPC .............. *H04W 16/08* (2013.01); *H04W 36/22* (2013.01); *H04W 36/32* (2013.01)

(58) Field of Classification Search
CPC .................................................... H04W 16/08
USPC ........... 455/68, 67.11, 418, 522, 422.1, 127.1
See application file for complete search history.

(56) References Cited

U.S. PATENT DOCUMENTS

| 5,499,386 A | 3/1996 | Karlsson |
| 7,483,713 B2 * | 1/2009 | Mori et al. ..................... 455/522 |

(Continued)

FOREIGN PATENT DOCUMENTS

| JP | 08-501430 | 2/1996 |
| JP | 2003-244161 A | 8/2003 |

(Continued)

OTHER PUBLICATIONS

An Office Action; "Notice of Reason for Rejection," issued by the Japanese Patent Office on Mar. 11, 2014, which corresponds to Japanese Patent Application No. 2012-512789 and is related to U.S. Appl. No. 13/643,888; with English language statement of relevance.

(Continued)

Primary Examiner — Sanh Phu
(74) Attorney, Agent, or Firm — Studebaker & Brackett PC (57) ABSTRACT

A radio communication system comprises a macro-cell base station (MeNB) and a pico-cell base station (PeNB). The macro-cell base station (MeNB) transmits, to the pico-cell base station (PeNB), a throughput representative value (MT) determined from the throughput of each of a plurality of radio terminals connected to the macro-cell base station (MeNB). The pico-cell base station (PeNB) receives the throughput representative value (MT) from the macro-cell base station (MeNB) and changes a bias value on the basis of the received throughput representative value (MT) and a throughput representative value (PT) determined from the throughput of each of a plurality of radio terminals connected to the pico-cell base station (PeNB), thereby adjusting the coverage of the pico-cell base station (PeNB).

12 Claims, 8 Drawing Sheets

(51) Int. Cl.
 *H04W 36/22* (2009.01)
 *H04W 36/32* (2009.01)

(56) References Cited

U.S. PATENT DOCUMENTS

2010/0035542 A1 2/2010 Fujishima et al.
2011/0009105 A1* 1/2011 Lee et al. .................. 455/418
2012/0142392 A1* 6/2012 Patel et al. ................. 455/522

FOREIGN PATENT DOCUMENTS

JP 2005-086446 A 3/2005
JP 2009-118320 A 5/2009
JP 2010-041685 A 2/2010
JP 2010-062951 A 3/2010

OTHER PUBLICATIONS

An Office Action; "Notice of Reason for Rejection," issued by the Japanese Patent Office on Sep. 3, 2013, which corresponds to Japanese Patent Application No. 2012-512789 and is related to U.S. Appl. No. 13/643,888; with Statement of Relevance.
QUALCOMM Incorporated; "Importance of Serving Cell Selection in Heterogeneous Networks"; 3GPP TSG-RAN WG1 #60; Feb. 22-26, 2012; San Francisco, CA.
International Search Report; PCT/JP2011/059612; Aug. 2, 2011.

* cited by examiner

RADIO COMMUNICATION SYSTEM, RADIO BASE STATION, AND COMMUNICATION CONTROL METHOD

TECHNICAL FIELD

The present invention relates to a radio communication technique and relates particularly to a radio communication system, a radio base station, and a communication control method to which a heterogeneous network is applied.

BACKGROUND ART

As the next generation systems to achieve higher-speed, larger-capacity communication than the 3rd and 3.5th generation cellular radio communication systems currently in use, there are LTE (Long Term Evolution) and LTE Advanced that is an enhanced version of LTE, which are standardized by the 3GPP (3rd Generation Partnership Project) being a standardization organization.

Meanwhile, there has been a plan to provide LTE Advanced with a heterogeneous network being a network in which low-power base stations (so-called pico-cell base stations, femtocell base stations, and the like) are placed within the communication area of a high-power base station (so-called a macro-cell base station). In a heterogeneous network, low-power base stations are placed within a high-traffic zone (so-called a hot zone), for example, thereby allowing distribution a load on a high-power base station to the low-power base stations.

However, radio terminals are generally configured to be connected to the radio base station providing a radio signal with the highest received power among multiple radio base stations. Thus, in a heterogeneous network, there is a possibility that radio terminals are less likely to be connected to a low-power base station with low transmission output.

In view of such circumstances, techniques have been proposed which involves such control that radio terminals are connected to a low-power base station even when the received power from this low-power base station is not the highest, thereby expanding the coverage (the range of the communication area) of the low-power base station (see Non-patent Document 1, for example).

PRIOR ART DOCUMENT

Non-Patent Document

Non-patent Document 1: 3GPP RI-101506 "Importance of Serving Cell Selection in Heterogeneous Networks" February, 2010.

SUMMARY OF THE INVENTION

Meanwhile, in LTE systems (including LTE Advanced), a technique considered effective in order to appropriately adjust the coverage of each of radio base stations involves adjusting the coverage of the radio base station in such a way as to equalize the loads on the radio base stations on the basis of load information exchanged between the radio base stations.

Specifically, the following load information are defined in LTE systems (see 3GPP TS 36.423 V9.2.0): (a) the number of PRBs (Physical Resource Blocks) in use, in units of which time-frequency resources are allocated; (b) the load on a backhaul between a radio base station and a core network; (c) the load on hardware of the radio base station; and (d) a capacity class being an index indicating the relative communication capacity of the radio base station, and the ratio of the communication capacity available in it.

However, there is the following problem in the technique which involves adjusting the coverage on the basis of the load information as above. Specifically, the problem is that even when the load on a first radio base station and the load on a second radio base station are equalized, the throughput of a radio terminal connected to the first radio base station and the throughput of a radio terminal connected to the second radio base station are not equalized, which in turn causes unfairness in throughput between the radio terminals. Note that the throughput refers to the amount of data communication per unit time, in general.

Particularly, in a heterogeneous network, when the coverage of a low-power base station is narrowed, the number of radio terminals connected to the low-power base station decreases, and thereby the throughputs of the radio terminals are likely to be higher than those of radio terminals connected to a high-power base station. In contrast, when the coverage of a low-power base station is expanded, the number of radio terminals connected to the low-power base station increases, and thereby the throughputs of the radio terminals are likely to be lower than radio terminals connected to a high-power base station.

In view of this, an objective of the present invention is to provide a radio communication system, a radio base station, and a communication control method capable of achieving fairness in throughput between radio terminals connected to different radio base stations.

In order to solve the problem described above, the present invention has features below. First of all, a feature of a radio communication system according to the present invention is summarized as follows. A radio communication system (radio communication system 1) comprises a first radio base station (e.g. macro-cell base station MeNB or pico-cell base station PeNB) and a second radio base station (e.g. macro-cell base station MeNB or pico-cell base station PeNB), wherein the first radio base station comprises a transmitter (e.g. X2 interface communication unit 140 or X2 interface communication unit 240) configured to transmit information indicating a first throughput representative value to the second radio base station, the first throughput representative value being obtained from throughputs of radio terminals connected to the first radio base station, and the second radio base station comprises a receiver (e.g. X2 interface communication unit 140 or X2 interface communication unit 240) configured to receive the information indicating the first throughput representative value from the first radio base station, and a coverage adjusting unit (e.g. coverage adjusting unit 124 or coverage adjusting unit 224) configured to adjust coverage of any one of the second radio base station and the first radio base station, on the basis of the information indicating the first throughput representative value received by the receiver, and information indicating a second throughput representative value obtained from throughputs of radio terminals connected to the second radio base station.

According to the feature, the throughput representative value is exchanged between the radio base stations, and the coverage is adjusted on the basis of the information indicating the throughput representative values corresponding to each of the first radio base station and the second radio base station. This makes it possible to equalize the throughput of each radio terminal connected to the first radio base station and the throughput of each radio terminal connected to the second radio base station, and thereby to achieve fairness in throughput between the radio terminals connected to different radio base stations.

Another feature of the radio communication system according to the present invention is summarized as follows. In the radio communication system according to the aforementioned feature, the information indicating the first throughput representative value contains a value obtained by averaging measured throughputs of the radio terminals connected to the first radio base station, and the information indicating the second throughput representative value contains a value obtained by averaging measured throughputs of the radio terminals connected to the second radio base station.

Another feature of the radio communication system according to the present invention is summarized as follows. In the radio communication system according to the aforementioned feature, the information indicating the first throughput representative value contains a value obtained by averaging predicted throughputs of the radio terminals connected to the first radio base station, and the information indicating the second throughput representative value contains a value obtained by averaging predicted throughputs of the radio terminals connected to the second radio base station.

Another feature of the radio communication system according to the present invention is summarized as follows. In the radio communication system according to the aforementioned feature, the information indicating the first throughput representative value contains a value indicating a measured throughput of a radio terminal with a deteriorated radio quality among measured throughputs of the radio terminals connected to the first radio base station, and the information indicating the second throughput representative value contains a value indicating a measured throughput of a radio terminal with a deteriorated radio quality among measured throughputs of the radio terminals connected to the second radio base station.

Another feature of the radio communication system according to the present invention is summarized as follows. In the radio communication system according to the aforementioned feature, the information indicating the first throughput representative value contains a value indicating a predicted throughput of a radio terminal with a deteriorated radio quality among predicted throughputs of the radio terminals connected to the first radio base station, and the information indicating the second throughput representative value contains a value indicating a predicted throughput of a radio terminal with a deteriorated radio quality among predicted throughputs of the radio terminals connected to the second radio base station.

Another feature of the radio communication system according to the present invention is summarized as follows. In the radio communication system according to the aforementioned feature, the coverage adjusting unit adjusts the coverage so as to decrease a difference between the information indicating the first throughput representative value and the information indicating the second throughput representative value.

Another feature of the radio communication system according to the present invention is summarized as follows. In the radio communication system according to the aforementioned feature, the coverage adjusting unit adjusts the coverage by changing a bias value used for correcting a radio quality value which is referred to at the time of selecting a connecting destination of a radio terminal.

Another feature of the radio communication system according to the present invention is summarized as follows. In the radio communication system according to the aforementioned feature, the coverage adjusting unit adjusts the coverage by changing transmission power of the radio base station to be subjected to the coverage adjustment.

Another feature of the radio communication system according to the present invention is summarized as follows. In the radio communication system according to the aforementioned feature, the second radio base station further comprises a determining unit (e.g. determining unit 125 or determining unit 225) configured to determine whether or not to perform the coverage adjustment of the coverage adjusting unit, on the basis of a value indicating a radio quality that a radio terminal connected to the second base station is expected to have after handover therefrom.

Another feature of the radio communication system according to the present invention is summarized as follows. In the radio communication system according to the aforementioned feature, any one of the first radio base station and the second radio base station is a low-power base station (e.g. pico-cell base station) with a lower transmission power than a macro-cell base station, and the coverage adjusting unit adjusts the coverage of the low-power base station.

A feature of the radio base station according to the present invention is summarized as follows. A radio base station (e.g. macro-cell base station MeNB or pico-cell base station PeNB) used in a radio communication system (radio communication system 1) capable of adjusting coverage on the basis of information exchanged between base stations, comprises a transmitter (e.g. X2 interface communication unit 140 or X2 interface communication unit 240) configured to transmit information indicating a first throughput representative value to a different radio base station, the first throughput representative value being obtained from throughputs of radio terminals connected to the radio base station.

A feature of the radio base station according to the present invention is summarized as follows. A radio base station comprises: a receiver configured to receive information indicating a first throughput representative value from a different radio base station (e.g. macro-cell base station MeNB or pico-cell base station PeNB), the first throughput representative value being obtained from throughputs of radio terminals connected to the different radio base station; and a coverage adjusting unit (e.g. coverage adjusting unit 124 or coverage adjusting unit 224) configured to adjust coverage of any one of the radio base station and the different radio base station, on the basis of the information indicating the first throughput representative value received by the receiver, and information indicating a second throughput representative value obtained from throughputs of radio terminals connected to the radio base station.

A feature of the communication control method according to the present invention is summarized as follows. A communication control method comprises the steps of: causing a first radio base station to transmit information indicating a first throughput representative value to a second radio base station, the first throughput representative value being obtained from throughputs of radio terminals connected to the first radio base station; causing the second radio base station to receive the information indicating the first throughput representative value from the first radio base station; and causing the second radio base station to adjust coverage of any one of the first radio base station and the second radio base station, on the basis of the information indicating the first throughput representative value received by the second radio base station, and information indicating a second throughput representative value obtained from throughputs of radio terminals connected to the second radio base station.

According to the present invention, it is possible to provide a radio communication system, a radio base station, and a communication control method capable of achieving fairness in throughput between radio terminals connected to different radio base stations.

DESCRIPTION OF THE EMBODIMENTS

Hereinbelow, a first embodiment, a second embodiment, and other embodiments of the present invention will be described. In the drawings in the following embodiments, the same or similar portions are denoted by the same or similar reference numerals.

Summary of LTE System

Before describing the first embodiment and the second embodiment, a summary of an LTE system will be described in relation to a content related to the present invention.

Figure 1:
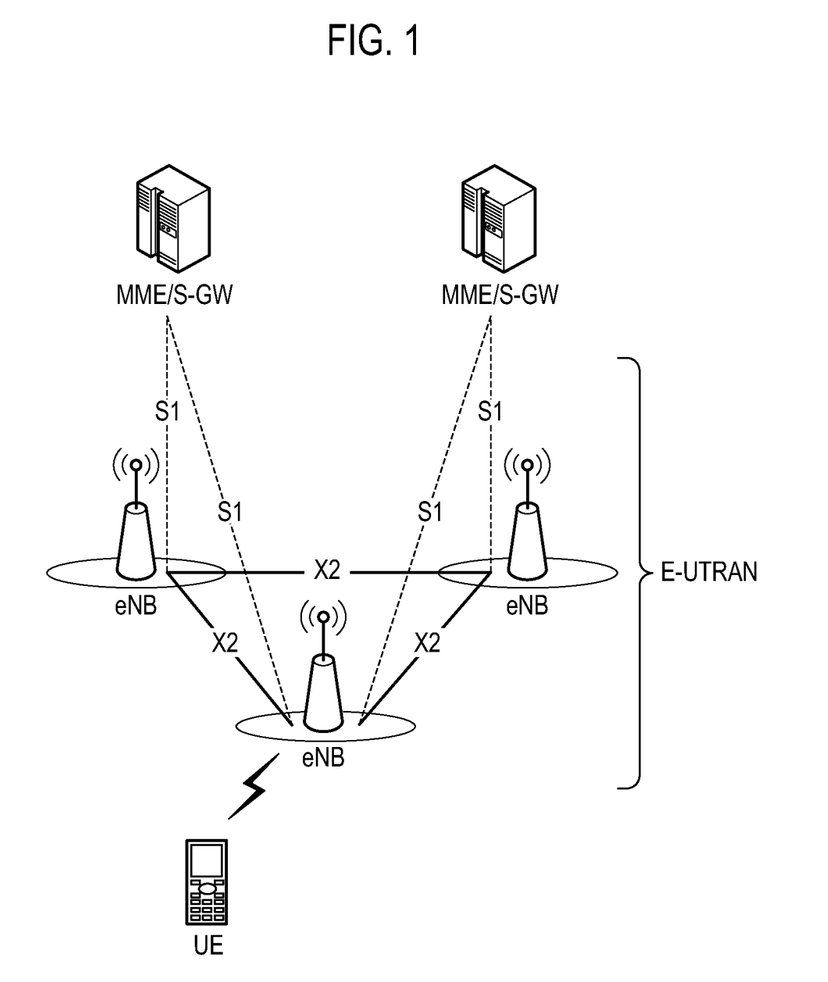
FIG. 1 is a diagram for describing a summary of each of LTE systems according to a first embodiment and a second embodiment.

FIG. 1 is a diagram for describing a summary of an LTE system. As shown in FIG. 1, multiple radio base stations eNB constitute an E-UTRAN (Evolved-UMTS Terrestrial Radio Access Network). Each of the multiple radio base station eNB forms a cell as a communication area to provide a service to a radio terminal UE.

The radio terminal UE is radio communication equipment a user possesses and is also called user equipment. The radio terminal UE is configured to measure quality of a radio signal received from a radio base station eNB (i.e. radio quality), and transmits a report of the result of the radio quality measurement (hereinafter, measurement result report) to the radio base station eNB at the connecting destination.

As the radio quality, reference signal received power (RSRP), signal to interference plus noise ratio (SINR), and the like are available. A measurement result report about RSRP is called a measurement report. A measurement result report about an index of SINR is called CQI (Channel Quality Indicator).

The radio base station eNB being the connecting destination of the radio terminal UE is configured to control handover which switches the connecting destination of the radio terminal UE, on the basis of the measurement report received from the radio terminal UE. In a case where the radio terminal UE receives reference signals from multiple radio base stations eNB, its measurement report contains multiple RSRPs of the multiple radio base stations eNB. In general, the radio base station eNB being the connecting destination of the radio terminal UE is configured select a radio base station eNB with the highest RSRP from among the multiple radio base stations eNB as a connecting destination of the radio terminal UE.

Moreover, the radio base station eNB being the connecting destination of the radio terminal UE is configured to allocate the radio terminal UE with resource blocks, in units of which radio resources are allocated, on the basis of the CQI received from the radio terminal UE. Further, the radio base station eNB being the connecting destination of the radio terminal UE is configured to determine a modulation class to be used in radio communication with the radio terminal UE, on the basis of the CQI received from the radio terminal UE. The modulation class is a combination of a modulation level and a coding rate. The throughput of radio communication between the radio terminal UE and the radio base station eNB being the connecting destination thereof is determined by the number of resource blocks and the modulation class used in the radio communication. However, in a case where the amount of data to be exchanged by the radio terminal UE is small, the actual throughput (hereinafter, measured throughput) is lower than the throughput determined by the number of resource blocks and the modulation class (hereinafter, predicted throughput).

The radio base stations eNB are capable of communicating with each other through an X2 interface which is a logical communication channel providing inter-base-station communication. The multiple radio base stations eNB are each capable of communicating with an EPC (Evolved Packet Core), or an MME (Mobility Management Entity) and an S-GW (Serving Gateway) to be specific, through an S1 interface.

The following first embodiment and second embodiment will be described by taking, as an example, a heterogeneous network configuration designed such that a pico-cell base station PeNB serving as a low-power base station (low-output base station) is placed within a macro-cell formed by a macro-cell base station MeNB serving as a high-power base station (high-output base station).

First Embodiment

Next, the first embodiment of the present invention will be described through (1) Configuration of Radio Communication System, (2) Configuration of Macro-cell Base Station, (3) Configuration of Pico-cell Base Station, (4) Operations of Radio Communication System, and (5) Advantageous Effect of First Embodiment in this order mentioned.

(1) Configuration of Radio Communication System

Figure 2:
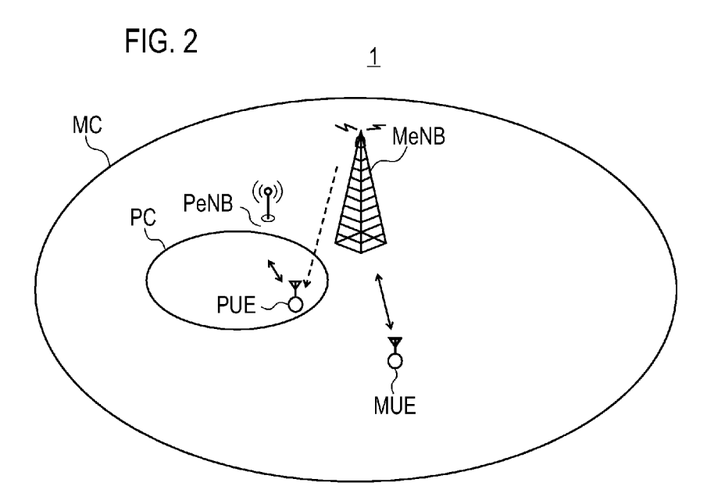
FIG. 2 is a schematic configuration diagram of each of radio communication systems according to according to the first embodiment and the second embodiments.

FIG. 2 is a schematic configuration diagram of a radio communication system 1 according to the first embodiment.

As shown in FIG. 2, the radio communication system 1 includes: a macro-cell base station MeNB; a radio terminal MUE which is connected to the macro-cell base station MeNB; a pico-cell base station PeNB which is placed within a macro-cell MC formed by the macro-cell base station MeNB and is located near the macro-cell base station MeNB; and a radio terminal PUE which is connected to the pico-cell base station PeNB within a pico-cell PC formed by the pico-cell base station PeNB. The macro-cell base station MeNB and the pico-cell base station PeNB are capable of inter-base-station communication by using the above-mentioned X2 interface.

In the first embodiment, the macro-cell base station MeNB corresponds to a first radio base station, and the pico-cell base station PeNB corresponds to a second radio base station. Note that although FIG. 2 shows only one radio terminal MUE and one radio terminal PUE, there are multiple radio terminals MUE and multiple radio terminals PUE in reality.

The pico-cell base station PeNB is a low-power base station lower than the macro-cell base station MeNB in transmission output and is placed within a high-traffic zone inside the macro-cell. In a heterogeneous network, the transmission output of the pico-cell base station PeNB is low. Thus, the coverage of the pico-cell base station PeNB is narrow in a case of employing a highest received power basis (hereinafter, RP basis) being a connecting-destination selection basis in which the radio terminal UE selects and is connected to the radio base station eNB with the highest RSRP. The coverage of the pico-cell base station PeNB is extremely narrow particularly in a situation where the location of the pico-cell base station PeNB is close to the macro-cell base station MeNB, thereby making it impossible to effectively utilize the pico-cell base station PeNB.

The first embodiment employs a bias value to achieve pseudo expansion of the coverage of the pico-cell base station PeNB without any increase in the transmission power of the pico-cell base station PeNB. Specifically, when the radio terminal UE can receive a radio signal from each of the macro-cell base station MeNB and the pico-cell base station PeNB, the RSRP of the pico-cell base station PeNB (hereinafter, $RSRP_{PeNB}$) and the RSRP of the macro-cell base station MeNB (hereinafter, $RSRP_{MeNB}$) are compared with each other with a bias value being added to the $RSRP_{PeNB}$.

Such addition increases the possibility of the biased $RSRP_{PeNB}$ becoming greater than the $RSRP_{MeNB}$. Consequently, the pico-cell base station PeNB becomes more likely to be selected as the connecting destination, which in turn expands the coverage of the pico-cell base station PeNB. Note that this connecting-destination selection basis is called a range expansion basis. To avoid unnecessary handover, the bias value takes one value for the pair of macro-cell base station MeNB and pico-cell base station PeNB and is shared by both radio stations of the macro-cell base station MeNB and the pico-cell base station PeNB.

(2) Configuration of Macro-cell Base Station

Figure 3:
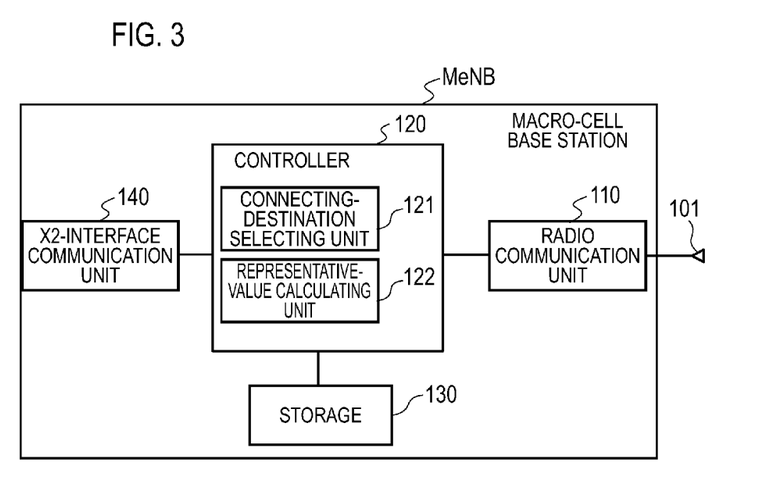
FIG. 3 is a block diagram showing the configuration of a macro-cell base station according to the first embodiment.

Next, the configuration of the macro-cell base station MeNB will be described. FIG. 3 is a block diagram showing the configuration of the macro-cell base station MeNB according to the first embodiment.

As shown in FIG. 3, the macro-cell base station MeNB includes an antenna unit 101, a radio communication unit 110, a controller 120, a storage 130, and an X2-interface communication unit 140.

The radio communication unit 110 is formed by using a radio frequency (RF) circuit, a base band (BB) circuit, and the like, for example, and is configured to transmit and receive radio signals to and from the radio terminal PUE through the antenna unit 101. The radio communication unit 110 is also configured to modulate signals it transmits and to demodulate signals it receives.

The controller 120 is formed by using a CPU, for example, and is configured to control various functions provided in the macro-cell base station MeNB. The storage 130 is formed by using a memory, for example, and is configured to store various types of information used for control of the macro-cell base station MeNB and other purposes. The X2-interface communication unit 140 is configured to perform inter-base-station communication with the other radio base station by using the X2 interface.

The controller 120 includes a connecting-destination selecting unit 121 and a representative-value calculating unit 122.

The connecting-destination selecting unit 121 is configured to select a radio base station as the next connecting destination of the radio terminal MUE on the basis of the measurement report received from the radio terminal MUE. When the measurement report contains RSRP and $RSRP_{PeNB}$, the connecting-destination selecting $RSRP_{MeNB}$ and performs such handover control that the connecting destination of the radio terminal MUE will be switched to the pico-cell base station PeNB on condition that the total of the $RSRP_{PeNB}$ and its bias value is greater than the $RSRP_{MeNB}$. The bias value is stored in the storage 130, and is changed as appropriate in the first embodiment.

The representative-value calculating unit 122 is configured to calculate a throughput representative value MT from the throughput of each radio terminal MUE connected to the macro-cell base station MeNB. In the first embodiment, the throughput representative value MT is a value obtained by averaging the measured throughputs of the radio terminals MUE (i.e. average value). Each measured throughput is a measured throughput in a downlink. It is, however, possible to consider using a measured throughput in an uplink. Meanwhile, as the measuring method for obtaining the measured throughputs, an existing technique can be utilized. The throughput representative value MT to be transmitted is not limited to the numerical value of the throughput representative value MT and may be an index of the throughput representative value MT.

The X2-interface communication unit 140 is configured to transmit the throughput representative value MT calculated by the representative-value calculating unit 122 to the pico-cell base station PeNB by using the X2 interface. In the first embodiment, the representative-value calculating unit 122 and the X2-interface communication unit 140 constitute a transmitter configured to transmit the throughput representative value MT as a first throughput representative value.

(3) Configuration of Pico-cell Base Station

Figure 4:
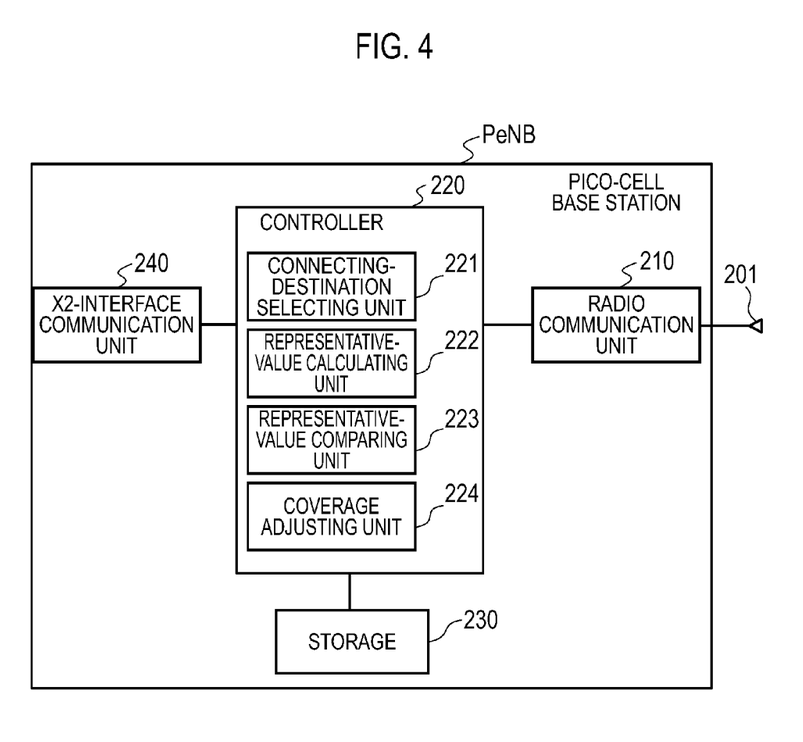
FIG. 4 is a block diagram showing the configuration of a pico-cell base station according to the first embodiment.

Next, the configuration of the pico-cell base station PeNB will be described. FIG. 4 is a block diagram showing the configuration of the pico-cell base station PeNB according to the first embodiment.

As shown in FIG. 4, the pico-cell base station PeNB includes an antenna unit 201, a radio communication unit 210, a controller 220, a storage 230, and an X2-interface communication unit 240.

The radio communication unit 110 is formed by using a radio frequency (RF) circuit, a base band (BB) circuit, and the like, for example, and is configured to transmit and receive radio signals to and from the radio terminal PUE through the antenna unit 201. The radio communication unit 210 is also configured to modulate signals it transmits and to demodulate signals it receives.

The controller 220 is formed by using a CPU, for example, and is configured to control various functions provided in the pico-cell base station PeNB. The storage 230 is formed by using a memory, for example, and is configured to store various types of information used for control of the pico-cell base station PeNB and other purposes.

The X2-interface communication unit 240 is configured to perform inter-base-station communication with the other radio base station by using the X2 interface. In the first embodiment, the X2-interface communication unit 240 corresponds to a receiver configured to receive the throughput representative value MT as the first throughput representative value from the macro-cell base station MeNB.

The controller 220 includes a connecting-destination selecting unit 221, a representative-value calculating unit 222, a representative-value comparing unit 223, and a coverage adjusting unit 224.

The connecting-destination selecting unit 221 is configured to select a radio base station as the next connecting destination of the radio terminal PUE on the basis of the measurement report received from the radio terminal PUE. When the measurement report contains $RSRP_{MeNB}$ and $RSRP_{PeNB}$, the connecting-destination selecting unit 221 performs such handover control that the connecting destination of the radio terminal PUE will be switched to the macro-cell base station MeNB on condition that the total of the $RSRP_{PeNB}$ and its bias value is less than the $RSRP_{MeNB}$. The bias value is stored in the storage 230, and is changed as appropriate in the first embodiment.

The representative-value calculating unit 222 is configured to calculate a throughput representative value PT from the throughput of each radio terminal PUE connected to the pico-cell base station PeNB. In the first embodiment, the throughput representative value PT is a value obtained by averaging the measured throughputs of the radio terminals PUE (i.e. average value). The throughput representative value PT is not limited to the numerical value of the throughput representative value PT and may be an index of the throughput representative value PT. Each measured throughput is a measured throughput in a downlink. It is, however, possible to consider using a measured throughput in an uplink. Meanwhile, as the measuring method for obtaining the measured throughputs, an existing technique can be utilized.

The representative-value comparing unit 223 is configured to compare the throughput representative value MT received by the X2-interface communication unit 240 and the throughput representative value PT calculated by the representative-value calculating unit 222. To stabilize the operation of an algorithm, a margin may be secured in the comparison between the throughput representative value MT and the throughput representative value PT.

The coverage adjusting unit 224 is configured to adjust the coverage of the pico-cell base station PeNB by changing the bias value in accordance with the result of the comparison by the representative-value comparing unit 223. The coverage adjusting unit 224 changes the bias value in such a way as to decrease the difference between the throughput representative value MT and the throughput representative value PT. Specifically, the bias value is increased when the throughput representative value PT is greater than the throughput representative value MT. This change leads to an increase in the number of radio terminals PUE connected to the pico-cell base station PeNB and a decrease in the number of radio terminals MUE connected to the macro-cell base station MeNB. In contrast, the bias value is decreased when the throughput representative value PT is less than the throughput representative value MT. This change leads to a decrease in the number of radio terminals PUE connected to the pico-cell base station PeNB and an increase in the number of radio terminals MUE connected to the macro-cell base station MeNB.

The storage 230 is configured to write the bias value changed by the coverage adjusting unit 224 over the bias value stored up to that point. Moreover, the X2-interface communication unit 240 is configured to transmit the bias value changed by the coverage adjusting unit 224 to the macro-cell base station MeNB by using the X2 interface.

(4) Operations of Radio Communication System

Figure 5:
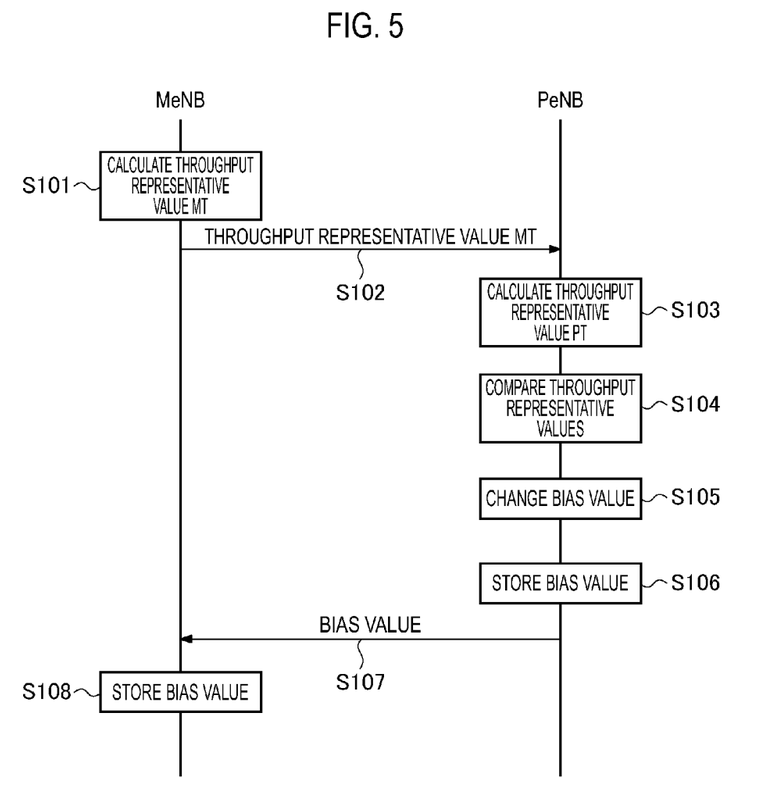
FIG. 5 is an operation sequence diagram showing operations of the radio communication system according to the first embodiment.

FIG. 5 is an operation sequence diagram showing operations of the radio communication system 1 according to the first embodiment.

In step S101, the representative-value calculating unit 122 of the macro-cell base station MeNB calculates the throughput representative value MT.

In step S102, the X2-interface communication unit 140 of the macro-cell base station MeNB transmits the throughput representative value MT calculated by the representative-value calculating unit 122 to the pico-cell base station PeNB by using the X2 interface. The X2-interface communication unit 240 of the pico-cell base station PeNB receives the throughput representative value MT from the macro-cell base station MeNB.

In step S103, the representative-value calculating unit 222 of the pico-cell base station PeNB calculates the throughput representative value PT.

In step S104, the representative-value comparing unit 223 of the pico-cell base station PeNB compares the throughput representative value MT received by the X2-interface communication unit 240 and the throughput representative value PT calculated by the representative-value calculating unit 222.

In step S105, the coverage adjusting unit 224 of the pico-cell base station PeNB changes the bias value in accordance with the result of the comparison by the representative-value comparing unit 223 to thereby adjust the coverage of the pico-cell base station PeNB.

In step S106, the storage 230 of the pico-cell base station PeNB writes the bias value changed by the coverage adjusting unit 224 over the bias value stored up to that point.

In step S107, the X2-interface communication unit 240 of the pico-cell base station PeNB transmits the bias value changed by the coverage adjusting unit 224 to the macro-cell base station MeNB by using the X2 interface. The X2-interface communication unit 140 of the macro-cell base station MeNB receives the bias value from the pico-cell base station PeNB.

In step S108, the storage 130 of the macro-cell base station MeNB writes the bias value received by the X2-interface communication unit 140 over the bias value stored up to that point.

(5) Advantageous Effect of First Embodiment

As described above, according to the first embodiment, the throughput representative value MT is exchanged between the macro-cell base station MeNB and the pico-cell base station PeNB, and the pico-cell base station PeNB adjusts its coverage on the basis of the throughput representative values MT and PT of the macro-cell base station MeNB and the pico-cell base station PeNB, respectively.

This makes it possible to equalize the throughput of each radio terminal MUE connected to the macro-cell base station MeNB and the throughput of each radio terminal PUE connected to the pico-cell base station PeNB, and thereby to achieve fairness in through put between the radio terminals MUE and PUE.

Modification 1 of First Embodiment

In this modification, the representative-value calculating unit 122 of the macro-cell base station MeNB is configured to calculate, as the throughput representative value MT, a value obtained by averaging the predicted throughputs of the radio terminals MUE connected to the macro-cell base station MeNB. Moreover, the representative-value calculating unit 222 of the pico-cell base station PeNB is configured to calculate, as the throughput representative value PT, a value obtained by averaging the predicted throughputs of the radio terminals PUE connected to the pico-cell base station PeNB.

As described above, each predicted throughput is calculated based on the SINR value (CQI) notified by the corresponding radio terminal and information on the bandwidth (the number of resource blocks) available to the radio terminal. While the measured throughput is dependent on the amount of data to be exchanged by the radio terminal, using the predicted throughput makes it possible to measure the potential throughput of the radio terminal.

Modification 2 of First Embodiment

In this modification, the representative-value calculating unit 122 of the macro-cell base station MeNB is configured to calculate, as the throughput representative value MT, a value indicating the measured throughput of a radio terminal MUE with a deteriorated radio quality among the measured throughputs of the radio terminals MUE connected to the macro-cell base station MeNB. Moreover, the representative-value calculating unit 222 of the pico-cell base station PeNB is configured to calculate, as the throughput representative value PT, a value indicating the measured throughput of a radio terminal PUE with a deteriorated radio quality among the measured throughputs of the radio terminals PUE connected to the pico-cell base station PeNB.

The measured throughput of a radio terminal MUE with a deteriorated radio quality refers, for example, to the measured throughput of a radio terminal MUE in the 5-th percentile of the radio terminals MUE in ascending order of measured throughput (i.e. 5%-ile value). Moreover, the measured throughput of a radio terminal PUE with a deteriorated radio quality refers, for example, to the measured throughput of a radio terminal PUE in the 5-th percentile of the radio terminals PUE in ascending order of measured throughput (i.e. 5%-ile value).

By using these 5%-ile values as the throughput representative values, it is possible to equalize the ratio of those radio terminals MUE with low throughputs among the radio terminals MUE and the ratio of those radio terminals PUE with low throughputs among the radio terminals PUE, and thereby to achieve fairness in throughput between the radio terminals MUE and PUE.

Modification 3 of First Embodiment

In this modification, the representative-value calculating unit 122 of the macro-cell base station MeNB is configured to calculate, as the throughput representative value MT, a value indicating the predicted throughput of a radio terminal MUE with a deteriorated radio quality among the predicted throughputs of the radio terminals MUE connected to the macro-cell base station MeNB. Moreover, the representative-value calculating unit 222 of the pico-cell base station PeNB is configured to calculate, as the throughput representative value PT, a value indicating the predicted throughput of a radio terminal PUE with a deteriorated radio quality among the predicted throughputs of the radio terminals PUE connected to the pico-cell base station PeNB.

In this way, it is possible to achieve the advantageous effect of each of Modification 1 and Modification 2 of the first embodiment described above.

Modification 4 of First Embodiment

The throughput representative values according to the first embodiment and its Modifications 1, 2, and 3 described above can be used in combination with each other.

In a first combination example, the throughput representative value MT is formed of a combination of a value obtained by averaging the measured throughputs of the radio terminals MUE and the 5%-ile value of the measured throughputs of the radio terminals MUE. Moreover, the throughput representative value PT is formed of a combination of a value obtained by averaging the measured throughputs of the radio terminals PUE and the 5%-ile value of the measured throughputs of the radio terminals PUE. In this case, the representative-value comparing unit 223 is configured to compare the combination of the value obtained by averaging the measured throughputs of the radio terminals MUE and the 5%-ile value of the measured throughputs of the radio terminals MUE and the combination of the value obtained by averaging the measured throughputs of the radio terminals PUE and the 5%-ile value of the measured throughputs of the radio terminals PUE. The representative-value comparing unit 223 determines one combination as "large" when the two values forming the combination are both larger than those of the other, while determining one combination as "small" when the two values forming the combination are both smaller than those of the other. In the other cases, the representative-value comparing unit 223 determines the combinations as equal.

In a second combination example, the throughput representative value MT is formed of a combination of a value obtained by averaging the predicted throughputs of the radio terminals MUE and the 5%-ile value of the predicted throughputs of the radio terminals MUE. Moreover, the throughput representative value PT is formed of a combination of a value obtained by averaging the predicted throughputs of the radio terminals PUE and the 5%-ile value of the predicted throughputs of the radio terminals PUE. In this case, the representative-value comparing unit 223 is configured to compare the combination of the value obtained by averaging the predicted throughputs of the radio terminals MUE and the 5%-ile value of the predicted throughputs of the radio terminals MUE and the combination of the value obtained by averaging the predicted throughputs of the radio terminals PUE and the 5%-ile value of the predicted throughputs of the radio terminals PUE. The representative-value comparing unit 223 determines one combination as "large" when the two values forming the combination are both larger than those of the other, while determining one combination as "small" when the two values forming the combination are both smaller than those of the other. In the other cases, the representative-value comparing unit 223 determines the combinations as equal.

In this way, it is possible to achieve the advantageous effect of each of the first embodiment and its Modifications 1, 2, and 3 described above.

Modification 5 of First Embodiment

In the first embodiment described above, the coverage adjusting unit 224 of the pico-cell base station PeNB adjusts the coverage of the pico-cell base station PeNB by changing the bias value in accordance with the result of the comparison by the representative-value comparing unit 223, but the coverage adjusting method is not limited to this case. The coverage of the pico-cell base station PeNB may be adjusted by changing the transmission power or the antenna tilt angle of the pico-cell base station PeNB in accordance with the result of the comparison by the representative-value comparing unit 223.

Figure 6:
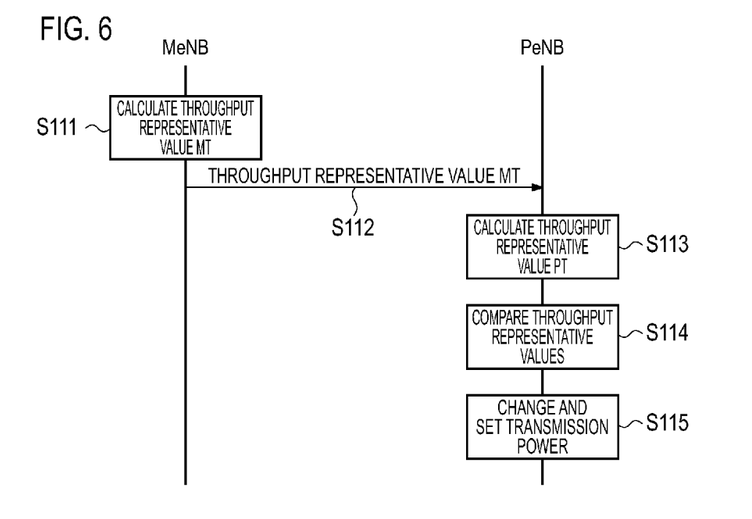
FIG. 6 is an operation sequence diagram showing operations of a radio communication system according to Modification 5 of the first embodiment.

FIG. 6 is an operation sequence diagram showing operations of the radio communication system 1 according to this modification. Here, a method involving the changing of the transmission power of the pico-cell base station PeNB will be described as an example.

Processes in steps S111 to S114 are the same as those in the first embodiment described above.

In step S115, the coverage adjusting unit 224 of the pico-cell base station PeNB adjusts the coverage of the pico-cell base station PeNB by changing the transmission power of the pico-cell base station PeNB in accordance with the result of the comparison by the representative-value comparing unit 223. The coverage adjusting unit 224 changes the transmission power of the pico-cell base station PeNB in such a way as to decrease the difference between the throughput representative value MT and the throughput representative value PT. Specifically, the transmission power of the pico-cell base station PeNB is increased when the throughput representative value PT is greater than the throughput representative value MT. This change leads to an increase in the number of radio terminals PUE connected to the pico-cell base station PeNB and a decrease in the number of radio terminals MUE connected to the macro-cell base station MeNB. In contrast, the transmission power of the pico-cell base station PeNB is decreased when the throughput representative value PT is less than the throughput representative value MT. This change leads to a decrease in the number of radio terminals PUE connected to the pico-cell base station PeNB and an increase in the number of radio terminals MUE connected to the macro-cell base station MeNB.

As described above, according to this modification, the coverage of the pico-cell base station PeNB can be adjusted in a different way from the first embodiment.

Modification 6 of First Embodiment

As described above, the adjustment of the coverage of the pi co-cell base station PeNB may cause handover of a radio terminal. However, such handover may possibly make it difficult for the radio terminal to continue its radio communication. Specifically, it becomes difficult to continue the radio communication if a control channel cannot be correctly received at the handover destination.

In this respect, in this modification, the adjustment of the coverage of the pico-cell base station PeNB is not performed in a case of predicting that adjusting the coverage of the pico-cell base station PeNB will result in a radio terminal experiencing difficulty in continuing its radio communication.

Figure 7:
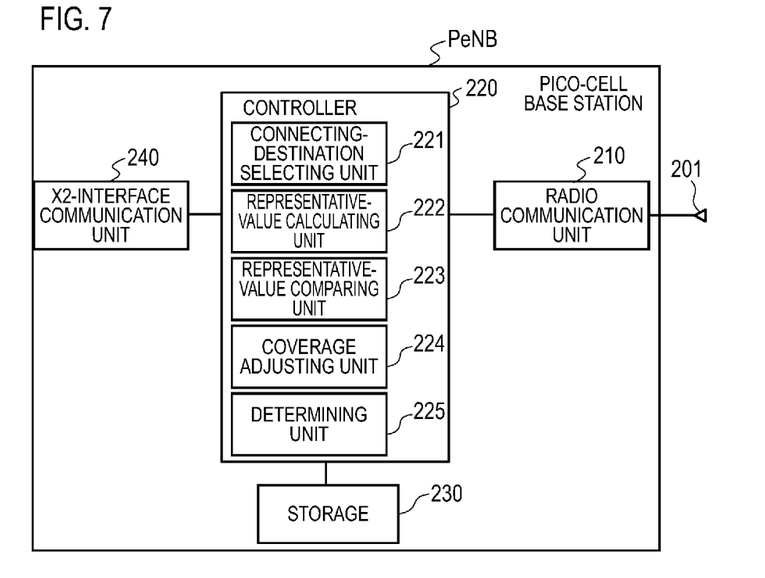
FIG. 7 is a block diagram showing the configuration of a pico-cell base station according to Modification 6 of the first embodiment.

FIG. 7 is a block diagram showing the configuration of the pico-cell base station PeNB according to this modification. As shown in FIG. 7, the pico-cell base station PeNB according to this modification differs from that in the first embodiment in that it further includes a determining unit 225. The determining unit 225 is configured to determine whether or not to perform the coverage adjustment of the coverage adjusting unit 224, on the basis of values indicating a radio quality that the radio terminal PUE is expected to have after handover to the macro-cell base station MeNB.

Specifically, the radio terminal PUE feeds back its CQI and measurement report (containing $RSRP_{MeNB}$ and $RSRP_{PeNB}$) to the pico-cell base station PeNB. From these pieces of information, the determining unit 225 can figure out beforehand an SINR value that the radio terminal within the cell of the pico-cell base station PeNB is expected to have after handover to the neighboring cell due to the coverage adjustment. The determining unit 225 determines that the coverage adjustment of the coverage adjusting unit 224 will not be performed, when the SINR value after the handover is less than a threshold value for a case where the control channel (such as a PDCCH) may possibly fail to be received properly.

According to this modification, it is possible to prevent a situation where there is a radio terminal experiencing difficulty in continuing its radio communication due to the adjustment of the coverage of the pico-cell base station PeNB.

Second Embodiment

In the first embodiment described above, the pico-cell base station PeNB adjusts its own coverage. In a second embodiment, the macro-cell base station MeNB adjusts the coverage of the pico-cell base station PeNB. In the second embodiment, the pico-cell base station PeNB corresponds to the first radio base station, and the macro-cell base station MeNB corresponds to the second radio base station.

Note that in the following, differences from the first embodiment will be described, and overlapping description will be omitted.

(1) Configuration of Macro-cell Base Station

Figure 8:
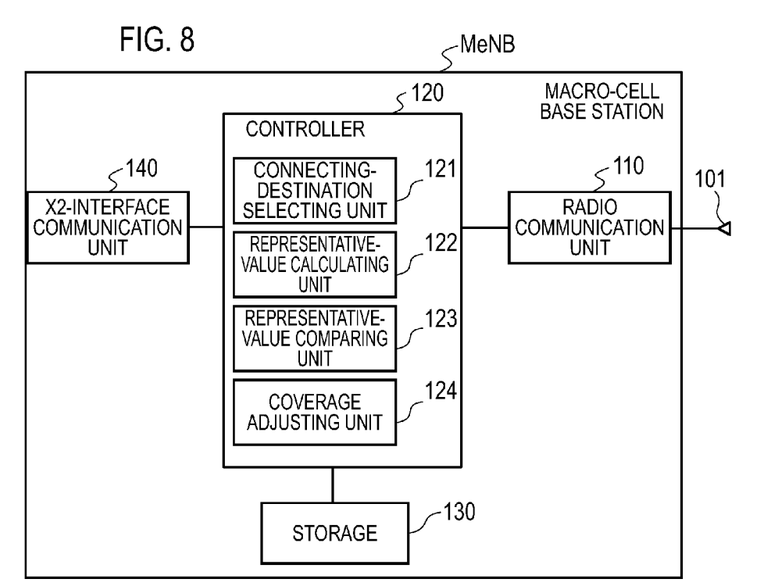
FIG. 8 is a block diagram showing the configuration of a macro-cell base station according to the second embodiment.

FIG. 8 is a block diagram showing the configuration of the macro-cell base station MeNB according to the second embodiment. As shown in FIG. 8, the macro-cell base station MeNB according to the second embodiment differs from that in the first embodiment in that its controller 120 includes a representative-value comparing unit 123 and a coverage adjusting unit 124. Moreover, in the second embodiment, the X2-interface communication unit 140 corresponds to the receiver configured to receive the throughput representative value PT as the first throughput representative value from the pico-cell base station PeNB.

The representative-value calculating unit 122 is configured to calculate the throughput representative value MT from the throughputs of the radio terminals MUE connected to the macro-cell base station MeNB. In the second embodiment, the throughput representative value PT is a value obtained by averaging the measured throughputs of the radio terminals PUE (i.e. average value).

The representative-value comparing unit 123 is configured to compare the throughput representative value PT received by the X2-interface communication unit 140 and the throughput representative value MT calculated by the representative-value calculating unit 122.

The coverage adjusting unit 124 is configured to adjust the coverage of the pico-cell base station PeNB by changing the bias value in accordance with the result of the comparison by the representative-value comparing unit 123. The coverage adjusting unit 124 changes the bias value in such a way as to decrease the difference between the throughput representative value MT and the throughput representative value PT. Specifically, the bias value is increased when the throughput representative value PT is greater than the throughput representative value MT. This change leads to an increase in the number of radio terminals PUE connected to the pico-cell base station PeNB and a decrease in the number of radio terminals MUE connected to the macro-cell base station MeNB. In contrast, the bias value is decreased when the throughput representative value PT is less than the throughput representative value MT. This change leads to a decrease in the number of radio terminals PUE connected to the pico-cell base station PeNB and an increase in the number of radio terminals MUE connected to the macro-cell base station MeNB.

The storage 230 is configured to write the bias value changed by the coverage adjusting unit 124 over the bias value stored up to that point. Moreover, the X2-interface communication unit 140 is configured to transmit the bias value changed by the coverage adjusting unit 124 to the pico-cell base station PeNB by using the X2 interface.

(2) Configuration of Pico-cell Base Station

Figure 9:
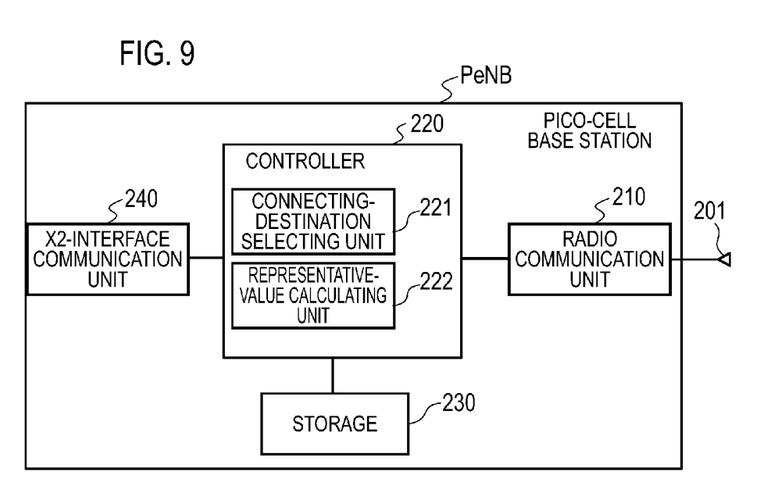
FIG. 9 is a block diagram showing the configuration of a pico-cell base station according to the second embodiment.

FIG. 9 is a block diagram showing the configuration of the pico-cell base station PeNB according to the second embodiment.

As shown in FIG. 9, the pico-cell base station PeNB according to the second embodiment does not include the representative-value comparing unit 223 and the coverage adjusting unit 224 described in the first embodiment. Moreover, in the second embodiment, the X2-interface communication unit 240 corresponds to the transmitter configured to transmit the throughput representative value PT as the first throughput representative value to the macro-cell base station MeNB.

(3) Operations of Radio Communication System

Figure 10:
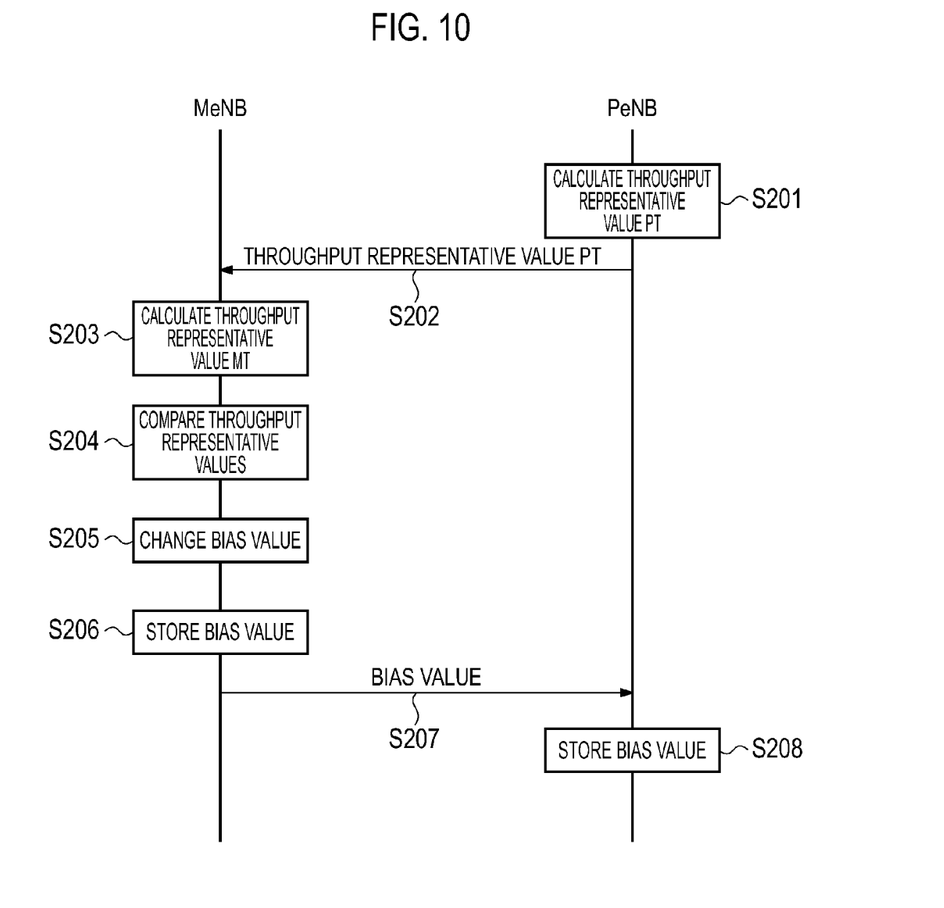
FIG. 10 is an operation sequence diagram showing operations of the radio communication system according to the second embodiment.

FIG. 10 is an operation sequence diagram showing operations of the radio communication system 1 according to the second embodiment.

In step S201, the representative-value calculating unit 222 of the pico-cell base station PeNB calculates the throughput representative value PT as the first throughput representative value.

In step S202, the X2-interface communication unit 240 of the pico-cell base station PeNB transmits the throughput representative value PT calculated by the representative-value calculating unit 222 to the macro-cell base station MeNB by using the X2 interface. The X2-interface communication unit 140 of the macro-cell base station MeNB receives the throughput representative value PT from the pico-cell base station PeNB.

In step S203, the representative-value calculating unit 122 of the macro-cell base station MeNB calculates the throughput representative value MT as the second throughput representative value.

In step S204, the representative-value comparing unit 123 of the macro-cell base station MeNB compares the throughput representative value PT received by the X2-interface communication unit 140 and the throughput representative value MT calculated by the representative-value calculating unit 122.

In step S205, the coverage adjusting unit 124 of the macro-cell base station MeNB changes the bias value in accordance with the result of the comparison by the representative-value comparing unit 123 to thereby adjust the coverage of the pico-cell base station PeNB.

In step S206, the storage 130 of the macro-cell base station MeNB writes the bias value changed by the coverage adjusting unit 224 over the bias value stored up to that point.

In step S207, the X2-interface communication unit 140 of the macro-cell base station MeNB transmits the bias value changed by the coverage adjusting unit 124 to the pico-cell base station PeNB by using the X2 interface. The X2-interface communication unit 240 of the pico-cell base station PeNB receives the bias value from the macro-cell base station MeNB.

In step S208, the storage 230 of the pico-cell base station PeNB writes the bias value received by the X2-interface communication unit 240 over the bias value stored up to that point.

(4) Advantageous Effect of Second Embodiment

As described above, according to the second embodiment, the throughput representative value PT is exchanged between the macro-cell base station MeNB and the pico-cell base station PeNB, and the macro-cell base station MeNB adjusts the coverage of the pico-cell base station PeNB on the basis of the throughput representative values MT and PT of the macro-cell base station MeNB and the pico-cell base station PeNB, respectively.

This makes it possible to equalize the throughput of each radio terminal MUE connected to the macro-cell base station MeNB and the throughput of each radio terminal PUE connected to the pico-cell base station PeNB, and thereby to achieve fairness in throughput between the radio terminals MUE and PUE.

Modification 1 of Second Embodiment

Modifications 1 to 4 of the first embodiment described above are applicable to the second embodiment as well. In a case of applying Modification 4 of the first embodiment described above to the second embodiment, the representative-value comparing unit 123 of the macro-cell base station MeNB determines one combination as "large" when the two values forming the combination are both larger than those of the other, while determining one combination as "small" when the two values forming the combination are both smaller than those of the other. In the other cases, the representative-value comparing unit 123 determines the combinations as equal.

Modification 2 of Second Embodiment

In the first embodiment described above, the coverage adjusting unit 124 of the macro-cell base station MeNB adjusts the coverage of the pico-cell base station PeNB by changing the bias value in accordance with the result of the comparison by the representative-value comparing unit 123, but the coverage adjusting method is not limited to this case. The coverage of the pico-cell base station PeNB may be adjusted by changing the transmission power or the antenna tilt angle of the pico-cell base station PeNB in accordance with the result of the comparison by the representative-value comparing unit 123.

Figure 11:
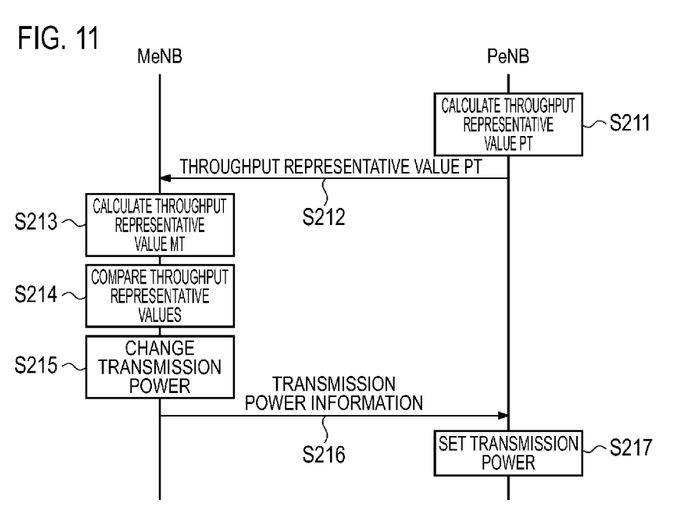
FIG. 11 is an operation sequence diagram showing operations of a radio communication system according to Modification 2 of the second embodiment.

FIG. 11 is an operation sequence diagram showing operations of the radio communication system 1 according to this modification. Here, a method involving the changing of the transmission power of the pico-cell base station PeNB will be described as an example. Note that an example of a method involving the changing of the antenna tilt angle of the pico-cell base station PeNB can be explained by reading the "transmission power" in the following description as the "antenna tilt angle."

Processes in steps S211 to S214 are the same as those in the second embodiment described above.

In step S215, the coverage adjusting unit 124 of the macro-cell base station MeNB adjusts the coverage of the pico-cell base station PeNB by changing the transmission power of the pico-cell base station PeNB in accordance with the result of the comparison by the representative-value comparing unit 123. The coverage adjusting unit 124 changes the transmission power of the pico-cell base station PeNB in such a way as to decrease the difference between the throughput representative value MT and the throughput representative value PT. Specifically, the transmission power of the pico-cell base station PeNB is increased when the throughput representative value PT is greater than the throughput representative value MT. In contrast, the transmission power of the pico-cell base station PeNB is decreased when the throughput representative value PT is less than the throughput representative value MT.

In step S216, the X2-interface communication unit 140 of the macro-cell base station MeNB transmits information indicating the transmission power changed by the coverage adjusting unit 124 to the pico-cell base station PeNB by using the X2 interface. The X2-inter face communication unit 240 of the pico-cell base station PeNB receives the information indicating the transmission power from the macro-cell base station MeNB.

In step S217, the controller 220 of the pico-cell base station PeNB sets the transmission power of the radio communication unit 210 in accordance with the information indicating the transmission power received by the X2-interface communication unit 240.

Modification 3 of Second Embodiment

Figure 12:
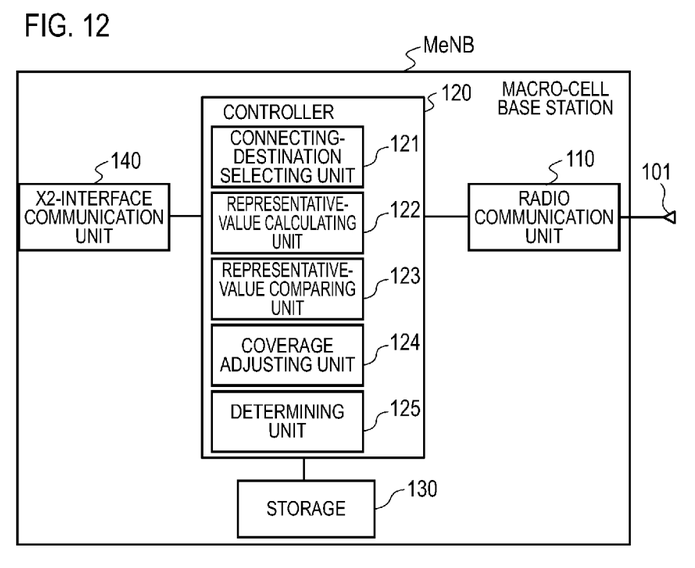
FIG. 12 is a block diagram showing the configuration of a macro-cell base station according to Modification 3 of the second embodiment.

FIG. 12 is a block diagram showing the configuration of the macro-cell base station MeNB according to this modification. As shown in FIG. 12, the macro-cell base station MeNB according to this modification differs from that in the second embodiment in that it further includes a determining unit 125. The determining unit 125 is configured to determine whether or not to perform the coverage adjustment of the coverage adjusting unit 224, on the basis of values indicating a radio quality that the radio terminal MUE is expected to have after handover to the pico-cell base station PeNB.

Specifically, the radio terminal MUE feeds back its CQI and measurement report (containing $RSRP_{MeNB}$ and $RSRP_{PeNB}$) to the macro-cell base station MeNB. From these pieces of information, the determining unit 125 can figure out beforehand an SINR value that the radio terminal within the cell of the macro-cell base station MeNB is expected to have after handover to the neighboring cell due to the coverage adjustment. The determining unit 125 determines that the coverage adjustment of the coverage adjusting unit 124 will not be performed, when the SINR value after the handover is less than a threshold value for a case where the control channel (such as a PDCCH) may possibly fail to be received properly.

Other Embodiments

Although the present invention has been described above based on embodiments, it should not be understood that the statement and the drawings constituting part of this disclosure limit this invention. Various alternative embodiments, examples, and operation techniques become apparent to those skilled in the art from this disclosure.

While there are only one macro-cell base station MeNB and one pico-cell base station PeNB in each foregoing embodiment, there may be multiple macro-cell base stations MeNB and multiple pico-cell base stations PeNB. In a case of receiving multiple throughput representative values from multiple radio base stations, the multiple throughput representative values should be averaged.

Meanwhile, LTE Advanced is planned to employ a relay node which is a radio base station wirelessly forming a backhaul, and also is planned to employ an X2 interface for the relay node. Then, the relay node may be the low-power base station according to the present invention.

Further, while each foregoing embodiment has been described in connection with an LTE system, the present invention may be applied to other radio communication systems such as a radio communication system based on WiMAX (IEEE 802.16).

As described above, it should be understood that the present invention includes various embodiments and the like that are not described herein. Therefore, the present invention should be limited solely by the matters to define the invention in the claims regarded as appropriate based on this disclosure.

It is to be noted that the entire contents of Japanese Patent Application No. 2010-104439 (filed on Apr. 28, 2010) are incorporated herein by reference.

INDUSTRIAL APPLICABILITY

As described above, the radio communication system, the radio base stations, and the communication control method according to the present invention are capable of achieving fairness in throughput between radio terminals connected to different radio base stations, and therefore useful for radio communication such as mobile communication.

The invention claimed is:

1. A radio communication system comprising a first radio base station and a second radio base station, wherein
the first radio base station comprises
a transmitter configured to transmit information indicating a first throughput representative value to the second radio base station, the first throughput representative value being obtained from throughputs of radio terminals connected to the first radio base station,
the second radio base station comprises
a receiver configured to receive the information indicating the first throughput representative value from the first radio base station, and
a coverage adjusting unit configured to adjust coverage of any one of the second radio base station and the first radio base station, on the basis of the information indicating the first throughput representative value received by the receiver, and information indicating a second throughput representative value obtained from throughputs of radio terminals connected to the second radio base station,
the information indicating the first throughput representative value contains a value indicating a throughput of a radio terminal with a deteriorated radio quality among throughputs of the radio terminals connected to the first radio base station, and
the information indicating the second throughput representative value contains a value indicating a throughput of a radio terminal with a deteriorated radio quality among throughputs of the radio terminals connected to the second radio base station.

2. The radio communication system according to claim 1, wherein
the information indicating the first throughput representative value contains a value obtained by averaging measured throughputs of the radio terminals connected to the first radio base station, and
the information indicating the second throughput representative value contains a value obtained by averaging measured throughputs of the radio terminals connected to the second radio base station.

3. The radio communication system according to claim 1, wherein
the information indicating the first throughput representative value contains a value obtained by averaging predicted throughputs of the radio terminals connected to the first radio base station, and the information indicating the second throughput representative value contains a value obtained by averaging predicted throughputs of the radio terminals connected to the second radio base station.

4. The radio communication system according to claim 1, wherein the value indicating the throughput of the radio terminal with the deteriorated radio quality contained in the information indicating the first throughput representative value is a value indicating a measured throughput of a radio terminal with a deteriorated radio quality among measured throughputs of the radio terminals connected to the first radio base station, and the value indicating the throughput of the radio terminal with the deteriorated radio quality contained in the information indicating the second throughput representative value is a value indicating a measured throughput of a radio terminal with a deteriorated radio quality among measured throughputs of the radio terminals connected to the second radio base station.

5. The radio communication system according to claim 1, wherein the value indicating the throughput of the radio terminal with the deteriorated radio quality contained in the information indicating the first throughput representative value is a value indicating a predicted throughput of a radio terminal with a deteriorated radio quality among predicted throughputs of the radio terminals connected to the first radio base station, and the value indicating the throughput of the radio terminal with the deteriorated radio quality contained in the information indicating the second throughput representative value is a value indicating a predicted throughput of a radio terminal with a deteriorated radio quality among predicted throughputs of the radio terminals connected to the second radio base station.

6. The radio communication system according to claim 1, wherein the coverage adjusting unit adjusts the coverage so as to decrease a difference between the information indicating the first throughput representative value and the information indicating the second throughput representative value.

7. The radio communication system according to claim 1, wherein the coverage adjusting unit adjusts the coverage by changing a bias value used for correcting a radio quality value which is referred to at the time of selecting a connecting destination of a radio terminal.

8. The radio communication system according to claim 1, wherein the coverage adjusting unit adjusts the coverage by changing transmission power of the radio base station to be subjected to the coverage adjustment.

9. The radio communication system according to claim 1, wherein the second radio base station further comprises a determining unit configured to determine whether or not to perform the coverage adjustment of the coverage adjusting unit, on the basis of a value indicating a radio quality that a radio terminal connected to the second base station is expected to have after handover therefrom.

10. The radio communication system according to claim 1, wherein any one of the first radio base station and the second radio base station is a low-power base station with a lower transmission power than a macro-cell base station, and the coverage adjusting unit adjusts the coverage of the low-power base station.

11. A radio base station comprising:

a receiver configured to receive information indicating a first throughput representative value from a different radio base station, the first throughput representative value being obtained from throughputs of radio terminals connected to the different radio base station; and a coverage adjusting unit configured to adjust coverage of any one of the radio base station and the different radio base station, on the basis of the information indicating the first throughput representative value received by the receiver, and information indicating a second throughput representative value obtained from throughputs of radio terminals connected to the radio base station, wherein the information indicating the first throughput representative value contains a value indicating a throughput of a radio terminal with a deteriorated radio quality among throughputs of the radio terminals connected to the different radio base station, and the information indicating the second throughput representative value contains a value indicating a throughput of a radio terminal with a deteriorated radio quality among throughputs of the radio terminals connected to the radio base station.

12. A communication control method comprising the steps of:

causing a first radio base station to transmit information indicating a first throughput representative value to a second radio base station, the first throughput representative value being obtained from throughputs of radio terminals connected to the first radio base station;

causing the second radio base station to receive the information indicating the first throughput representative value from the first radio base station; and causing the second radio base station to adjust coverage of any one of the first radio base station and the second radio base station, on the basis of the information indicating the first throughput representative value received by the second radio base station, and information indicating a second throughput representative value obtained from throughputs of radio terminals connected to the second radio base station, wherein the information indicating the first throughput representative value contains a value indicating a throughput of a radio terminal with a deteriorated radio quality among throughputs of the radio terminals connected to the first radio base station, and the information indicating the second throughput representative value contains a value indicating a throughput of a radio terminal with a deteriorated radio quality among throughputs of the radio terminals connected to the second radio base station.

* * * * *